US010606575B2

(12) United States Patent
Avinash Dorle et al.

(10) Patent No.: US 10,606,575 B2
(45) Date of Patent: Mar. 31, 2020

(54) EFFICIENCY OF COMPUTING RESOURCE CONSUMPTION VIA IMPROVED APPLICATION PORTFOLIO DEPLOYMENT

(71) Applicant: Accenture Global Solutions Limited, Dublin (IE)

(72) Inventors: Vinay Avinash Dorle, Bangalore (IN); Ranjana Bhalchandra Narawane, Mumbai (IN); Manu Khanna, Bangalore (IN); Uday Varma, Bangalore (IN); Dinesh Chandar Vasudevan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/944,371

(22) Filed: Apr. 3, 2018

(65) Prior Publication Data
US 2019/0303118 A1    Oct. 3, 2019

(51) Int. Cl.
*G06F 8/60* (2018.01)
*G06F 8/77* (2018.01)
(Continued)

(52) U.S. Cl.
CPC ............... *G06F 8/60* (2013.01); *G06F 8/77* (2013.01); *G06F 9/5027* (2013.01);
(Continued)

(58) Field of Classification Search
CPC .. G06F 11/3447; G06F 11/361; G06F 16/285; G06F 8/60; G06F 8/61
See application file for complete search history.

(56) References Cited

U.S. PATENT DOCUMENTS 9,152,694 B1 * 10/2015 Padidar ............... G06F 21/51
9,229,902 B1 *  1/2016 Leis ..................... H04L 41/082
(Continued)

FOREIGN PATENT DOCUMENTS

EP    3401787 A1    11/2018

OTHER PUBLICATIONS

Wikipedia, Application portfolio management, https://en.wikipedia.org/wiki/Application_portfolio_management, Mar. 22, 2018 7 pages.
(Continued)

*Primary Examiner* — Wei Y Zhen
*Assistant Examiner* — Brahim Bourzik
(74) *Attorney, Agent, or Firm* — Harrity & Harrity, LLP

(57) ABSTRACT

A device may process application data or historical data to identify a set of metrics to be used to analyze a set of applications or to identify baseline values for the set of metrics. The device may determine a score, for each application of the set of applications, based on values for the set of metrics for the each application of the set of applications. The device may determine a refined classification for the each application of the set of applications based on the historical data or information related to the classification or the score. The device may generate a set of recommendations related to optimizing a current deployment of the set of applications. The device may perform an action to implement the set of recommendations related to optimizing the current deployment of the set of applications.

20 Claims, 5 Drawing Sheets

(51) Int. Cl.
*H04L 12/24* (2006.01)
*G06F 9/445* (2018.01)
*G06F 16/28* (2019.01)
*G06F 9/50* (2006.01)
*G06Q 10/06* (2012.01)

(52) U.S. Cl.
CPC .......... *G06F 9/5072* (2013.01); *G06F 16/287* (2019.01); *G06Q 10/06393* (2013.01); *H04L 41/5003* (2013.01); *H04L 41/5009* (2013.01); *G06F 9/44505* (2013.01); *G06F 2209/501* (2013.01); *G06F 2209/504* (2013.01); *G06F 2209/508* (2013.01)

(56) References Cited

U.S. PATENT DOCUMENTS

| | | | | |
|---|---|---|---|---|
| 9,251,033 | B2* | 2/2016 | Kirchhofer | G06F 9/5083 |
| 9,311,066 | B1* | 4/2016 | Garman | G06F 8/60 |
| 9,471,778 | B1* | 10/2016 | Seo | H04L 63/1425 |
| 10,469,411 | B1* | 11/2019 | Patel | H04L 49/90 |
| 2003/0046396 | A1* | 3/2003 | Richter | G06F 9/505 |
| | | | | 709/226 |
| 2011/0098973 | A1* | 4/2011 | Seidman | G06F 11/0709 |
| | | | | 702/179 |
| 2013/0036122 | A1* | 2/2013 | Cohen | G06F 11/3409 |
| | | | | 707/741 |
| 2014/0331276 | A1* | 11/2014 | Frascadore | H04L 63/20 |
| | | | | 726/1 |
| 2015/0032894 | A1* | 1/2015 | Rosensweig | H04L 41/5019 |
| | | | | 709/226 |
| 2015/0363303 | A1* | 12/2015 | Argenti | G06F 9/4856 |
| | | | | 717/131 |
| 2016/0050589 | A1* | 2/2016 | Safavi | H04W 36/0033 |
| | | | | 455/436 |
| 2017/0257303 | A1* | 9/2017 | Boyapalle | H04L 67/34 |
| 2018/0089328 | A1* | 3/2018 | Bath | G06F 3/0481 |
| 2018/0191743 | A1* | 7/2018 | Reddy | H04L 63/0227 |

OTHER PUBLICATIONS

Wikipedia, Application software, https://en.wikipedia.org/wiki/Application_software, Mar. 25, 2018, 4 pages.
Berral J.L., et al., "ALOJA: A Framework for Benchmarking and Predictive Analytics in Hadoop Deployments", IEEE Transactions on Emerging Topics in Computing, Oct. 1, 2017, vol. 5 (4), pp. 480-493, XP055618251.
Extended European Search Report for Application No. EP19159245.0, dated Sep. 13, 2019, 12 pages.
Jiangtao Z., et al., "Resource Provision Algorithms in Cloud Ccomputing: A Survey", Journal of Network and Computer Applications, Academic Press, United States, Feb. 6, 2016, vol. 64, pp. 23-42, XP029470707.
Joonseok P., et al., "C-RCE: an Approach for Constructing and Managing a Cloud Service Broker", Journal of Grid Computing, Netherlands, Nov. 29, 2017, vol. 17 (1), pp. 137-168, XP036755795.
Willnecker F., et al., "Multi-Objective Optimization of Deployment Topologies for Distributed Applications", ACM Transactions on Internet Technology, United States, Jan. 20, 2018, vol. 18 (2), pp. 1-21, XP058382094.

* cited by examiner

EFFICIENCY OF COMPUTING RESOURCE CONSUMPTION VIA IMPROVED APPLICATION PORTFOLIO DEPLOYMENT

BACKGROUND

An application is a computer program designed to perform a group of consolidated functions, tasks, or activities for the benefit of the user. An application may be bundled with a computer or system software of the computer or may be published separately. Examples of applications include word processors, spreadsheets, accounting applications, a web browser, a media player, and/or the like.

SUMMARY

According to some possible implementations, a device may include one or more memories; and one or more processors, communicatively coupled to the one or more memories, to process application data or historical data to identify a set of metrics to be used to analyze a set of applications or to identify baseline values for the set of metrics. The application data may be related to the set of applications to be analyzed. The historical data may be related to another set of applications previously analyzed. The application data or the historical data may be received from one or more devices or from one or more sensors associated with the one or more devices. The one or more processors may determine a score, for each application of the set of applications, based on values for the set of metrics for the each application of the set of applications after processing the application data or the historical data. The score may indicate a classification for the each application of the set of applications. The one or more processors may determine a refined classification for the each application of the set of applications based on the historical data or information related to the classification or the score. The refined classification may be used to determine a manner in which to optimize a deployment of the set of applications. The one or more processors may generate a set of recommendations based on the refined classification. The one or more processors may perform an action to implement the set of recommendations related to optimizing the deployment of the set of applications.

According to some possible implementations, a method may include processing, by a device, application data or historical data to identify a set of metrics to be used to analyze a set of applications or to identify baseline values for the set of metrics. The application data may be related to the set of applications to be analyzed. The historical data may be related to another set of applications previously analyzed. The application data or the historical data may be received from one or more devices or from one or more sensors associated with the one or more devices. The method may include determining, by the device, a score, for each application of the set of applications, based on values for the set of metrics for the each application of the set of applications. The score may indicate a classification for the each application of the set of applications. The method may include determining, by the device, a refined classification for the each application of the set of applications based on the historical data or information related to the classification or the score. The method may include generating, by the device, a set of recommendations related to optimizing a current deployment of the set of applications after determining the refined classification. The method may include performing, by the device, an action to implement the set of recommendations related to optimizing the current deployment of the set of applications.

According to some possible implementations, a non-transitory computer-readable medium may store one or more instructions that, when executed by one or more processors, cause the one or more processors to receive application data or historical data. The application data may be related to a set of applications to be analyzed. The historical data may be related to another set of applications. The application data or the historical data may be received from one or more devices or one or more sensors associated with the one or more devices. The one or more instructions, when executed by the one or more processors, may cause the one or more processors to process the application data or the historical data to identify a set of metrics to be used to analyze the set of applications or to identify baseline values for the set of metrics. The one or more instructions, when executed by the one or more processors, may cause the one or more processors to determine a score, for each application of the set of applications, based on values for the set of metrics for the each application of the set of applications. The score may indicate a classification for the each application of the set of applications. The one or more instructions, when executed by the one or more processors, may cause the one or more processors to determine a refined classification for the each application of the set of applications based on the historical data or information related to the classification or the score. The refined classification may be used to determine a manner in which to optimize a current deployment of the set of applications. The one or more instructions, when executed by the one or more processors, may cause the one or more processors to perform an action to implement a set of recommendations related to optimizing the current deployment of the set of applications.

DETAILED DESCRIPTION

The following detailed description of example implementations refers to the accompanying drawings. The same reference numbers in different drawings may identify the same or similar elements.

Applications may be deployed using various computing resources. For example, the applications may be deployed using servers, virtual machines, and/or the like. An organization may use hundreds, thousands, or more applications related to operations of the organization. Over time, these applications may become obsolete, may become outdated, may become redundant with each other, may fall out of use, can be re-deployed in a more efficient manner (e.g., from individual installations to a cloud deployment), and/or the like. The result of this is that computing resources related to the applications are inefficiently consumed, thereby decreasing a computing capability of the organization, impeding operations of the organization, increasing costs for the organization, and/or the like. In addition, the organization may not be capable of analyzing a technical impact of these aspects of application deployment across the organization and/or for dozens, hundreds, or thousands of applications to optimize deployment of the applications.

Some implementations described herein provide an application analysis platform that is capable of analyzing a portfolio of applications and determining a manner in which to modify the deployment of the applications to improve an efficiency of the deployment. In this way, the application analysis platform provides a way to optimize consumption of computing resources to improve the consumption of the computing resources. This improves a deployment of a portfolio of applications via a more efficient deployment. In addition, this conserves computing resources that would otherwise have been consumed via a less efficient deployment. Further, this improves a computing capability of an organization through optimization of a deployment of a portfolio of applications. Further, this reduces or eliminates costs associated with an inefficient deployment of a portfolio of applications (e.g., technical support costs, employee downtime due to malfunctioning applications, costs related to unused applications, consolidating redundant applications, etc.). Further, this provides a tool to analyze a portfolio of applications in the context of organization processes such that updates and/or changes to the portfolio align with the organization processes and/or relevant metrics.

Figure 1:
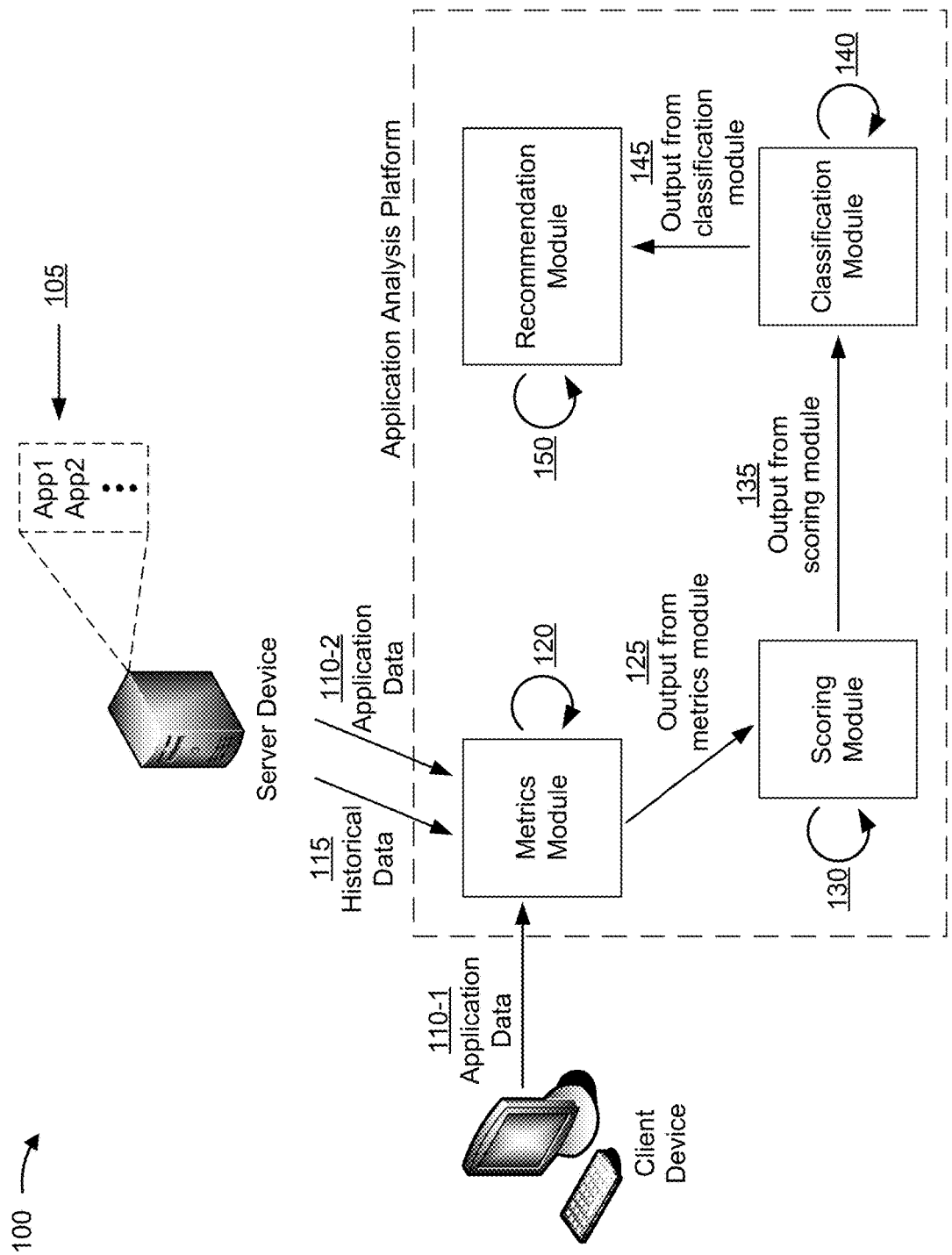
FIG. 1 is a diagram of an overview of an example implementation described herein.

FIG. 1 is a diagram of an overview of an example implementation 100 described herein. As shown in FIG. 1, implementation 100 includes a client device, a server device, and an application analysis platform (e.g., that includes a metrics module, a scoring module, a classification module, and a recommendation module).

As shown in FIG. 1, and by reference number 105, the server device may host multiple applications (e.g., dozens, hundreds, or more applications) (shown as "App1," "App2," etc.). The applications may be related to operations of an organization. For example, the applications may include a set of billing-related applications, a set of employee records-related applications, a set of customer management-related applications, and/or the like.

As shown by reference numbers 110-1 and 110-2, the application analysis platform may receive application data (e.g., via a metrics module associated with the application analysis platform). For example, the application analysis platform may receive data that identifies a quantity of interfaces associated with each application of the applications, a quantity and/or release version of databases used by the applications, a software version associated with each application of the applications, whether each application of the applications is installed locally on client devices or whether each application of the applications is cloud-based, a quantity of user of each application of the applications, job titles of each user of the users of the applications, an amount of various computing resources used by each application of the applications, and/or the like. In some implementations, the application analysis platform may receive the application data via input by a user of the client device (e.g., input via a user interface displayed on a display associated with the client device). Additionally, or alternatively, the application analysis platform may receive the application data from the server device (e.g., in real-time, as the applications are being used, etc.).

The application analysis platform may receive thousands, millions, or more data elements (e.g., as application data or as historical data described below). In this way, the application analysis platform may receive a data set that cannot be analyzed manually or objectively by a human actor (e.g., in a consistent manner). In addition, the application analysis platform may receive data elements for applications across hundreds, thousands, or more organizations, thereby facilitating cross-organizational analysis, access to a centralized analysis tool for application portfolios, and/or the like.

As shown by reference number 115, the application analysis platform may receive historical data from the server device (e.g., via a metrics module associated with the application analysis platform). For example, the historical data may identify a historical computing resource consumption of other applications, an update history of the other applications, past data for the other applications associated with other organizations, and/or the like. In this way, the historical data can facilitate identification of baseline values for metrics to be used to evaluate deployment of the applications, a contextual analysis of deployment of the applications relative to the other applications (e.g., based on particular days of the week, times of the day, etc.), and/or the like.

As shown by reference number 120, the metrics module may process the application data and/or the historical data. For example, the metrics module may process the historical data to identify metrics to be used to analyze the applications and/or to determine baseline values for the metrics. The metrics module may use a machine learning model to identify similar applications to the applications to be analyzed and/or to process historical data for the similar applications and/or for the applications to be analyzed to identify metrics that are indicative of a performance, an efficiency of computing resource consumption, and/or the like of the similar applications and/or the applications to be analyzed. In addition, metrics related to an organization's process may be used to determine whether changes to a portfolio of applications affects (either positively or negatively) the organization's process (e.g., to measure an improvement to the organization's process, to ensure that a change to a portfolio of applications does not disrupt the organization's process, and/or the like. In this way, the metrics module can select optimal metrics to be used to analyze applications. Additionally, or alternatively, the metrics module may identify baseline values for the metrics based on the historical information. For example, the metrics module may identify a normal distribution of values for the metrics over a period of time, an average value for the metrics over a period of time, and/or the like. Additionally, or alternatively, the metrics module may determine values for the metrics for the set of applications to be analyzed.

As shown by reference number 125, the metrics module may provide output to the scoring module. For example, the output from the metrics module may include information that identifies a set of metrics to be used to analyze the applications, values for the set of metrics for the applications to be analyzed, and/or baseline values for the set of metrics based on the historical data.

As shown by reference number 130, the scoring module may determine, for each application of the applications being analyzed, a score that indicates a classification for each application of the applications. For example, the score may be indicative of whether an application is healthy, unhealthy, needs functional improvement, needs technical improvement, and/or the like. The scoring module may use a machine learning model to determine the score and/or the classification. For example, the scoring module may determine a score for an application based on a combination of values, for various metrics, identified from the application data, the values of the metrics for the application relative to baseline values for the metrics, and/or the like.

As shown by reference number 135, the scoring module may provide, to a classification module, output from the scoring module. For example, the output may identify the score determined by the scoring module, a classification associated with the score, and/or the like.

As shown by reference number 140, the classification module may process the classification indicated by the score to determine a refined classification for each application of the applications. For example, a refined classification may be a classification that is modified based on historical data, factors related to an application, an objective related to optimizing an application deployment, anomalies detected in the application data, and/or the like. The classification module may use a machine learning model to identify prior modifications to classifications (e.g., manual overrides) for other applications. For example, a prior analysis of an application may have indicated that an application was unhealthy (e.g., performing slower than needed), but a manager overrode this result because the organization was experiencing an anticipated temporary surge in use of the application and this information may be used to determine a refined classification for a similarly situated application. Additionally, or alternatively, the classification module may use the machine learning model to determine a refined classification based on an objective related to optimization of deployment of the application. For example, an organization may prefer to maximize availability of an application relative to performance of the application. In this case, the classification module may modify a classification of an application to healthy based on the application having a threshold availability, regardless of whether the performance of the application satisfies a threshold.

In some implementations, determining a refined classification may include determining a refined score in a similar manner and then re-determining the classification based on the refined score.

As shown by reference number 145, the classification module may provide, to the recommendation module, output from the classification module. For example, the output from the classification module may include information that identifies a refined classification for each application of the applications analyzed.

As shown by reference number 150, the recommendation module may generate a set of recommendations related to optimizing deployment of the set of applications. For example, the set of recommendations may include replacing an application with another application, updating an application to a newer version, decommissioning an application, re-platforming an application (e.g., from client device deployment to cloud deployment), separating a single application into multiple applications or combining applications into a single application, remediating an application (e.g., modifying code and/or an architecture of the application to improve an efficiency of the application), and/or the like. The recommendation module may use a machine learning model to generate the set of recommendations. For example, the machine learning model may generate the set of recommendations based on the refined classification of the application, manual modifications of recommendations made for similar applications with similar values for metrics, and/or the like. The recommendation module may generate application specific recommendations. For example, the recommendation module may use a bot to identify, on the Internet, a specific update for an application (e.g., a specific version of an application to which to update the application), may determine a link to download the updated version of the application, and/or the like.

The application analysis platform may output the set of recommendations (e.g., for display via a display associated with the client device). Additionally, or alternatively, the application analysis platform may perform an action to facilitate implementation of the set of recommendations. For example, the application analysis platform may update an application, may uninstall an application, may generate a work order to re-platform the application, and/or the like.

In this way, the application analysis platform may optimize deployment of a portfolio of applications (e.g., may rationalize the portfolio of applications by reducing a quantity of applications in the portfolio, may modernize the portfolio of applications by updating legacy applications, etc.). This improves functioning of the applications via an improvement in the performance of the portfolio of applications, an availability of the portfolio of applications, and/or the like. In addition, by optimizing deployment of the portfolio of applications, the applications analysis platform conserves computing resources that would otherwise be consumed via a less efficient deployment of the portfolio of applications. Further, this improves operations of the organization, by facilitating dynamic optimization of the portfolio of applications as the organization changes (e.g., as the needs of the organization change, as the customer base of the organization changes, etc.).

As indicated above, FIG. 1 is provided merely as an example. Other examples are possible and may differ from what was described with regard to FIG. 1. For example, although some implementations were described in the context of a single application, the application analysis platform may perform the implementations for hundreds, thousands, or more applications associated with hundreds, thousands, or more organizations.

Figure 2:
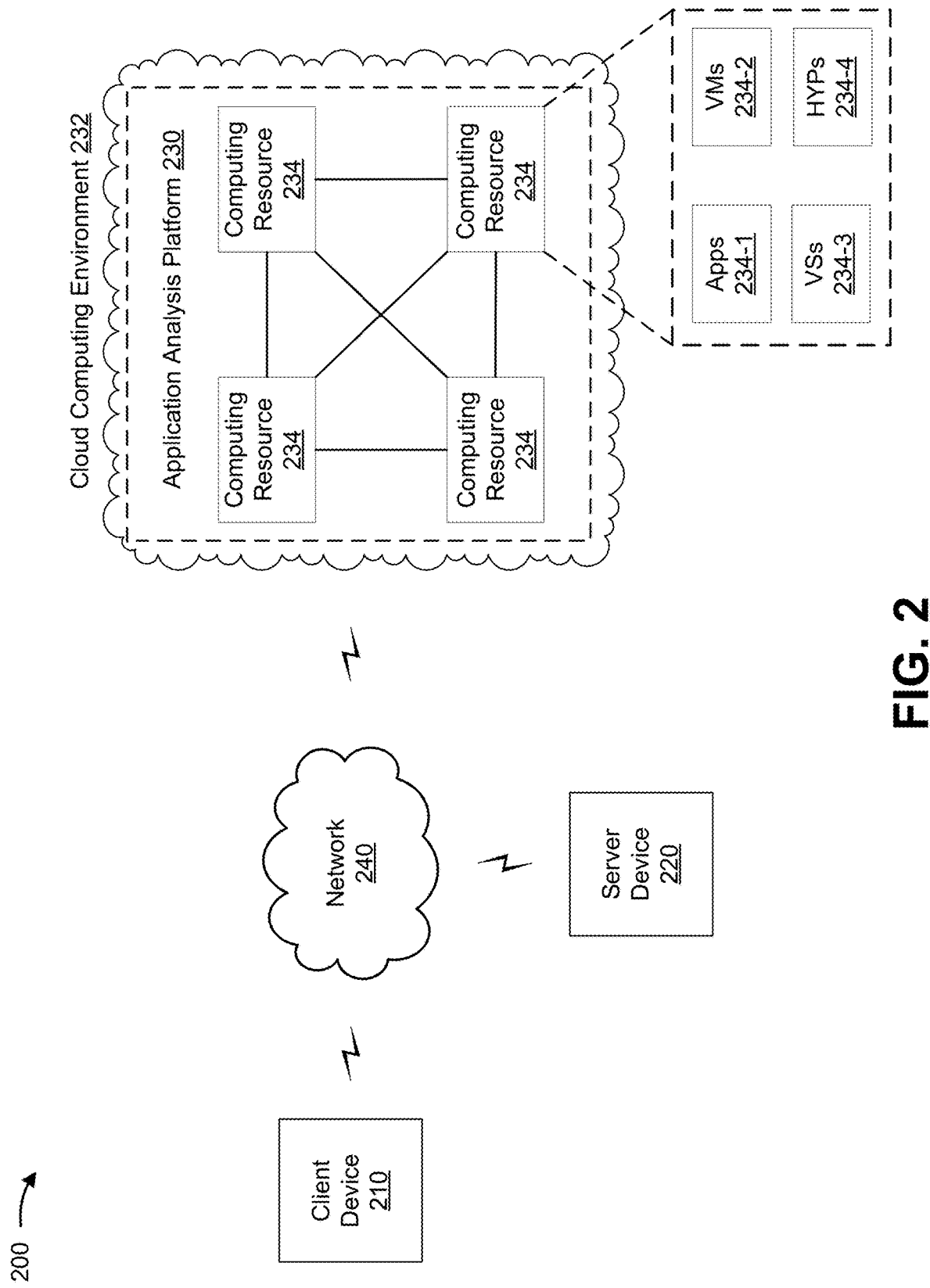
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, an application analysis platform 230 in a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information associated with a portfolio of applications to be analyzed. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may provide, to application analysis platform 230, application data related to a portfolio of applications to be analyzed, as described elsewhere herein. Additionally, or alternatively, client device 210 may receive, from application analysis platform 230, output from application analysis platform 230, as described elsewhere herein. In some implementations, one or more applications may be executed on client device 210, hosted on client device 210, installed on client device 210, accessed remotely by client device 210, and/or the like.

Server device 220 includes one or more devices capable of receiving, generating storing, processing, and/or providing information associated with a portfolio of applications to be analyzed. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may provide, to application analysis platform 230, application data and/or historical data, as described elsewhere herein.

Application analysis platform 230 includes one or more devices capable of receiving, generating, storing, processing, and/or providing information related to analyzing a portfolio of applications. For example, application analysis platform 230 may include a cloud server or a group of cloud servers. In some implementations, application analysis platform 230 may be designed to be modular such that certain software components can be swapped in or out depending on a particular need. As such, application analysis platform 230 may be easily and/or quickly reconfigured for different uses.

In some implementations, as shown, application analysis platform 230 may be hosted in cloud computing environment 232. Notably, while implementations described herein describe application analysis platform 230 as being hosted in cloud computing environment 232, in some implementations, application analysis platform 230 may not be cloud-based (i.e., may be implemented outside of a cloud computing environment) or may be partially cloud-based.

Cloud computing environment 232 includes an environment that hosts application analysis platform 230. Cloud computing environment 232 may provide computation, software, data access, storage, and/or other services that do not require end-user knowledge of a physical location and configuration of a system and/or a device that hosts application analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host application analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with application analysis platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
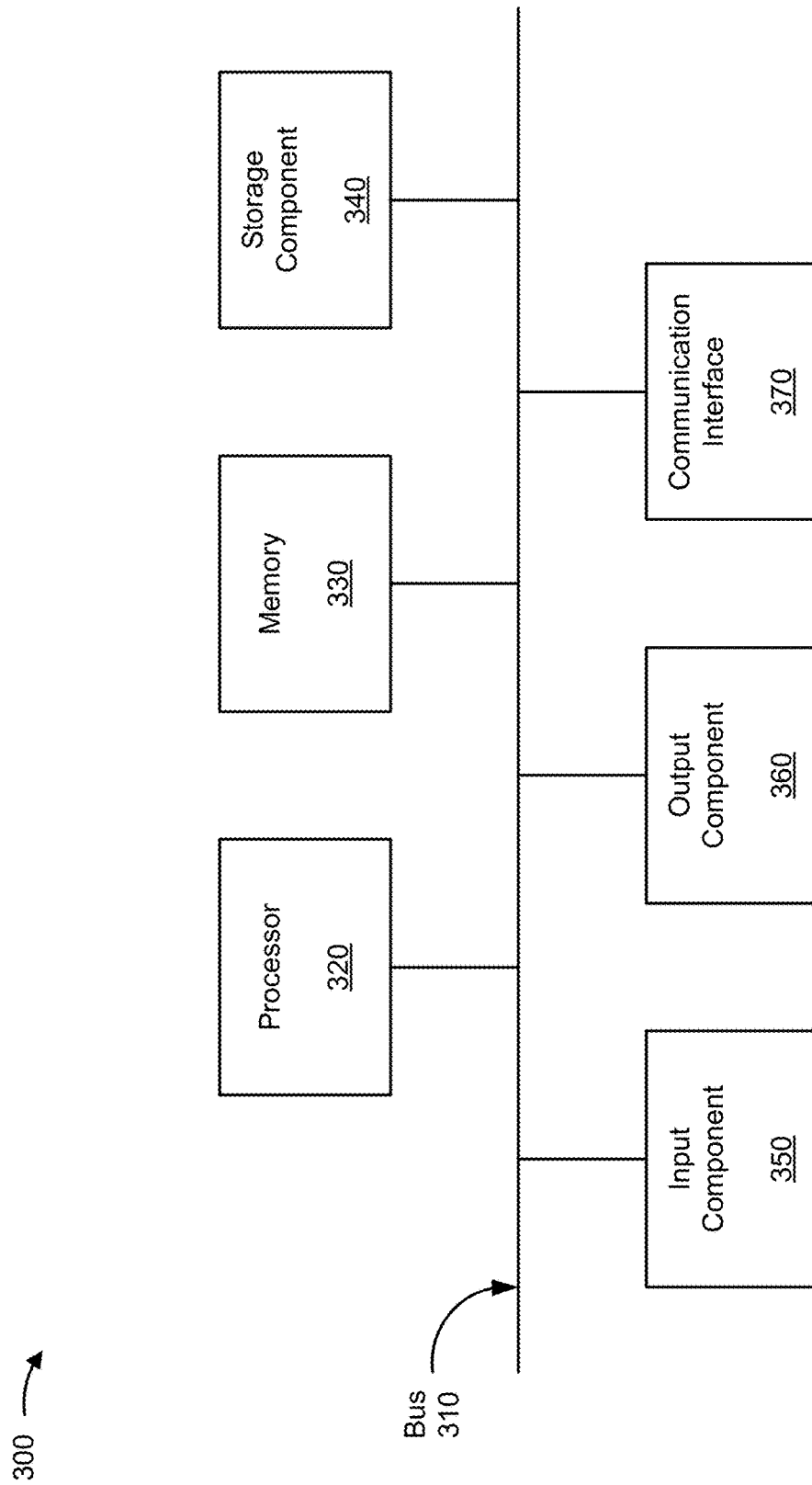
FIG. 3 is a diagram of example components of one or more devices of FIG. 2.

FIG. 3 is a diagram of example components of a device 300. Device 300 may correspond to client device 210, server device 220, application analysis platform 230, and/or computing resources 234. In some implementations, client device 210, server device 220, application analysis platform 230, and/or computing resources 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
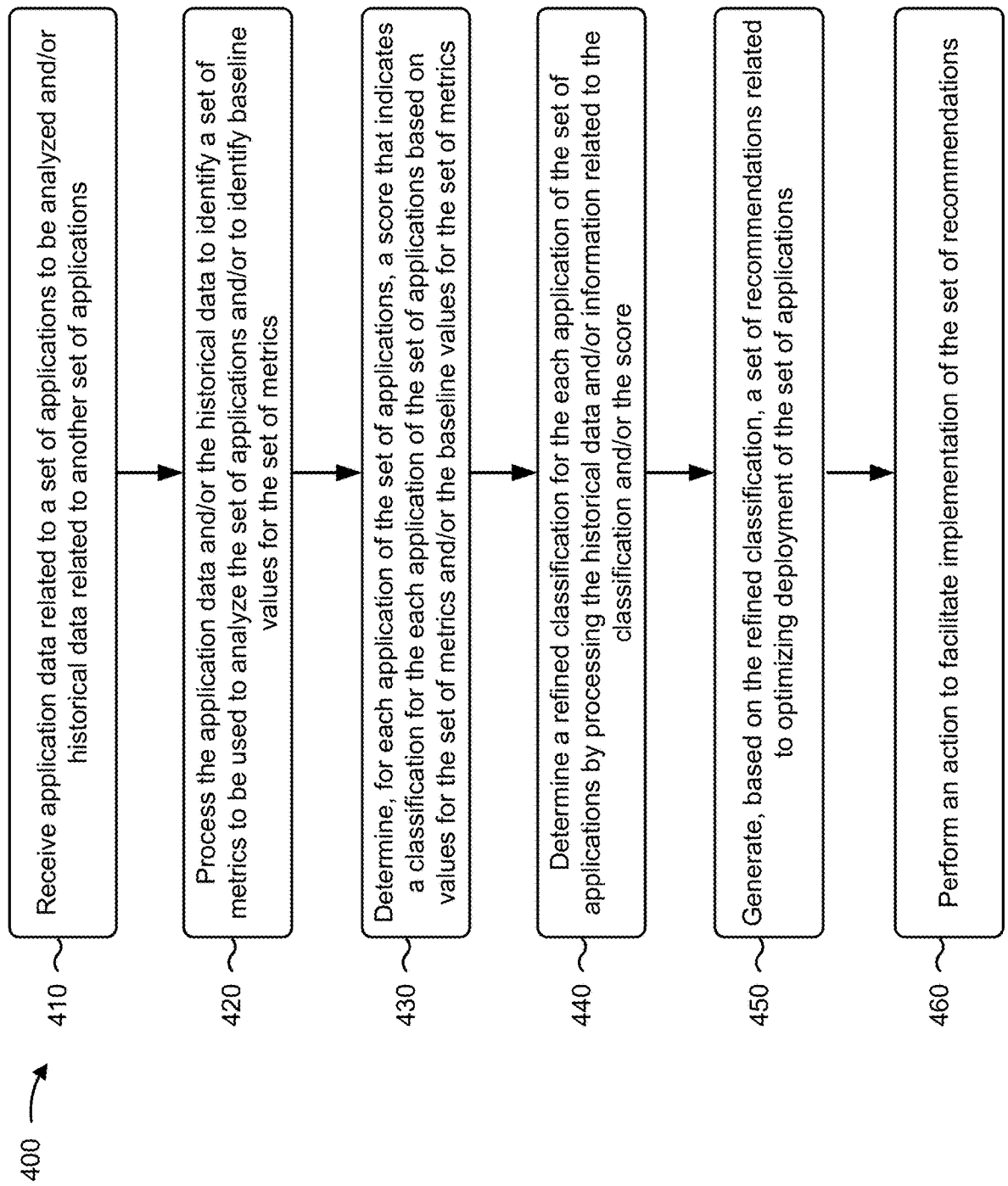
FIG. 4 is a flow chart of an example process for improving an efficiency of computing resource consumption via improved application portfolio deployment.

FIG. 4 is a flow chart of an example process 400 for improving an efficiency of computing resource consumption via improved application portfolio deployment. In some implementations, one or more process blocks of FIG. 4 may be performed by application analysis platform 230. In some implementations, one or more process blocks of FIG. 4 may be performed by another device or a group of devices separate from or including application analysis platform 230, such as client device 210, server device 220, and/or computing resource 234.

As shown in FIG. 4, process 400 may include receiving application data related to a set of applications to be analyzed and/or historical data related to another set of applications (block 410). For example, application analysis platform 230 may receive (e.g., using computing resource 234, processor 320, input component 350, communication interface 370, and/or the like) application data related to a set of applications to be analyzed and/or historical data related to another set of applications. In some implementations, application analysis platform 230 may receive the application data from a set of sensors on client device 210 (e.g., sensors on hundreds, thousands, or more client devices 210). For example, the set of sensors may monitor applications running on client device 210 and may provide the application data to application analysis platform 230 (e.g., may provide information that identifies a timing of when the applications are running, how long the applications are running, what computing resources are being used and when during running of the applications, and/or the like).

In some implementations, the application data may identify a quantity of users of an application, a quantity of interfaces of the application, an amount of computing resources (e.g., of client device 210 and/or server device 220) that the application is using, a quantity of lines of code associated with the application, a quantity and/or type of service tickets associated with the application, a quantity of full-time equivalents associated with supporting the application, whether source code for the application is available, an importance of the application (e.g., a high importance, a medium importance, or a low importance), an amount of time the application is unavailable, a quantity of modules associated with the application, and/or the like. In some implementations, the historical data may be similar to application data but may be associated with applications previously analyzed, applications associated with another organization, and/or the like. In some implementations, the application data and/or the historical data may include thousands, millions, or more data elements. In this way, the application data and/or the historical data may include a data set that cannot be processed manually or objectively (e.g., in a consistent manner) by a human actor.

In some implementations, application data may relate to various types of parameters (e.g., functional parameters, technical parameters, governance parameters, digital parameters, financial parameters, etc.). For example, functional parameters may include a quantity of users of an application, a criticality of an application, a quantity and/or types of locations served by the application, a quantity of concurrent users of the application, an organizational alignment of the application, a usability of the application, a service window requirement of the application, and/or the like.

Additionally, or alternatively, and as another example, technical parameters may include a quantity of modules associated with an application, a quantity of interfaces associated with the application, a quantity of lines of code of the application, a quantity of instances of the application on a server, a quantity of defects related to the application in a back-log, a level of customization of the application, a version of the application and/or middleware technology, development tools (and version thereof) associated with the application, an operating system (and version thereof) associated with the application, a stability of the application, a volatility of the application, a quantity of enhancement requests associated with the application, maintenance time dedicated to the application, and/or the like. Additionally, or alternatively, and as another example, governance parameters may include whether an organization has access to source code of an application, whether the application contains sensitive/personnel data, whether application technical documentation is available for the application, whether user documentation is available for the application, whether application deployment documentation is available for the application, whether monitoring systems are used to monitor the application, and/or the like.

Additionally, or alternatively, and as another example, digital parameters may include whether an application can be digitally assessed, an extent to which the application is ready for mobile deployment, an extent to which the application is cloud deployed, whether digital support is available for the application, whether analytics can be tracked via the application, whether artificial intelligence can be used with the application, whether the application can be used in an Internet of things (IoT) deployment scenario, and/or the like. Additionally, or alternatively, and as another example, financial parameters may include a personnel cost related to the application, a hardware and/or hosting cost related to the application, a software cost of the application, an operational cost of the application, a projects/enhancements cost related to the application, a total cost of ownership per year related to the application, and/or the like. In some implementations, a parameter may be related to and/or included in a metric. For example, a metric may relate to a parameter.

In some implementations, the set of applications and/or the other set of applications may include hundreds, thousands, or more applications. In some implementations, the set of applications may be associated with an organization. In some implementations, the other set of applications may be associated with hundreds, thousands, or more other organizations. In this way, application analysis platform 230 may analyze the set of applications relative to applications associated with other organizations in a manner not possible by a human actor.

In some implementations, application analysis platform 230 may receive the application data and/or the historical data based on input via client device 210 (e.g., user input via a user interface displayed on a display associated with client device 210). Additionally, or alternatively, application analysis platform 230 may receive the application data and/or the historical data from server device 220. For example, application analysis platform 230 may receive application data from server device 220 as the set of applications is being used (e.g., in real-time or near real-time). Additionally, or alternatively, and as another example, application analysis platform 230 may receive historical data from memory resources of server device 220. Additionally, or alternatively, application analysis platform 230 may receive application data and/or historical data periodically, based on requesting the application data and/or the historical data, according to a schedule, and/or the like.

In some implementations, application analysis platform 230 may map information identifying each application of the set of applications (e.g., to various organizational processes for the purposes of identifying metrics related to the organization's processes that can be used to monitor an effect of changes to a portfolio of applications on the organizational processes). For example, application analysis platform 230 may map each application of the set of applications to an area of the organization, such as a department, a functional area, a team, and/or the like of an organization with which the set of applications is associated. By mapping each application of the set of applications to an area of the organization (e.g., functional/organizational process mapping), application analysis platform 230 may be capable of identifying metrics related to the area of the organization that can be used to evaluate the deployment of the set of applications and/or to identify potential issues with the areas of the organization that may be caused by the set of applications. In some implementations, application analysis platform 230 may use a machine learning model to map the set of applications. For example, the machine learning model may have been trained on a training set of data that identifies applications and corresponding areas of the organization associated with the applications. This facilitates mapping of unstructured and/or unorganized data. Additionally, or alternatively, this reduces or eliminates a need for human intervention with regard to mapping applications.

In this way, application analysis platform 230 may receive application data related to a set of applications to be analyzed and/or historical data related to another set of applications prior to processing the application data and/or the historical data to identify a set of metrics and/or values for the set of metrics.

As further shown in FIG. 4, process 400 may include processing the application data and/or the historical data to identify a set of metrics to be used to analyze the set of applications and/or to identify baseline values for the set of metrics (block 420). For example, application analysis platform 230 may process (e.g., using computing resource 234, processor 320, and/or the like) the application data and/or the historical data to identify a set of metrics to be used to analyze the set of applications and/or to identify baseline values for the set of metrics. In some implementations, application analysis platform 230 may process the application data and/or the historical data using a metrics module, as described elsewhere herein.

In some implementations, application analysis platform 230 may perform a lookup, in a data structure, of information that identifies the set of applications and corresponding metrics to be used to analyze the set of metrics. Additionally, or alternatively, application analysis platform 230 may perform a lookup, in a data structure, of information that identifies areas associated with the set of applications and corresponding metrics to be used to analyze the set of applications. Additionally, or alternatively, application analysis platform 230 may process the application data and/or the historical data using a machine learning model. For example, application analysis platform 230 may use a machine learning model that has been trained on information related to other sets of applications and corresponding metrics that have been used to analyze the other sets of applications.

In some implementations, application analysis platform 230 may process, using the machine learning model, information related to the other set of applications and/or the set of applications to identify applications of the other set of applications that are similar to the set of applications (e.g., based on a function of the applications, based on type of user, such as job title, of the applications, an area of the organization associated with the applications, based on a deployment of the applications, such as a client device 210 deployment or a cloud deployment, and/or the like). In some implementations, after identifying the applications of the other set of applications that are similar to the set of applications, application analysis platform 230 may identify metrics that are indicative of a quality of a deployment of the applications (e.g., a performance of the applications, an amount of computing resources being consumed by the applications, a health of the applications, etc.). For example, application analysis platform 230 may identify the metrics using a machine learning model that has been trained on information that identifies metrics related to applications and whether the metrics are indicative of a quality of deployment of the applications. This conserves processing resources of application analysis platform 230 by reducing an amount of historical data application analysis platform 230 needs to process (e.g., by reducing or eliminating a need for application analysis platform 230 to process historical data for applications that are not similar to the set of applications being analyzed). In addition, this improves an accuracy of analyzing the set of applications.

In some implementations, application analysis platform 230 may determine baseline values for the metrics (e.g., benchmarks for a performance indicator, baseline values per business process, etc.). For example, application analysis platform 230 may determine baseline values for a particular time period, by averaging values for a metric across a time period, by weighting different values for the metrics for different time periods, and/or the like.

In some implementations, application analysis platform 230 may determine values for the same metrics for the set of applications. For example, application analysis platform 230 may process the application data to determine values for the set of metrics for the set of applications being analyzed, in a manner similar to that described with regard to determining the baseline values for the metrics. In some implementations, application analysis platform 230 may re-determine the values periodically, according to a schedule, in real-time as updated application data is received, and/or the like. In some implementations, application analysis platform 230 may provide information identifying the values for the metrics for display via a user interface (e.g., displayed on a display associated with client device 210). In some implementations, application analysis platform 230 may update the user interface as the values for the set of metrics change.

In this way, application analysis platform 230 may process the application data and/or the historical data to identify a set of metrics and/or baseline values for the set of metrics prior to determining a score for the set of applications.

As further shown in FIG. 4, process 400 may include determining, for each application of the set of applications, a score that indicates a classification for the each application of the set of applications based on values for the set of metrics and/or the baseline values for the set of metrics (block 430). For example, application analysis platform 230 may determine (e.g., using computing resource 234, processor 320, and/or the like), for each application of the set of applications, a score that indicates a classification for the each application of the set of applications based on values for the set of metrics and/or the baseline values for the set of metrics. In some implementations, application analysis platform 230 may determine the score using a scoring module, as described elsewhere herein. In some implementations, a classification may indicate a health of an application (e.g., healthy, unhealthy, needs functional improvement, needs technical improvement, etc.), a performance of the application (e.g., performing normally, experiencing a performance anomaly, not performing to a needed level, etc.), a computing resource consumption of the application (e.g., a high consumption, a low consumption, an abnormal consumption, etc.), and/or the like.

In some implementations, application analysis platform 230 may determine the score based on values for the set of metrics relative to a threshold. For example, application analysis platform 230 may determine the score based on values for the set of metrics satisfying a threshold, satisfying a threshold by a threshold amount, and/or the like. Additionally, or alternatively, application analysis platform 230 may determine the score based on values for the set of metrics relative to the baseline values for the set of metrics. For example, application analysis platform 230 may determine whether the values are within a threshold amount of the baseline values, are with a range of values that includes the baseline values, satisfy the baseline values, and/or the like.

In some implementations, application analysis platform 230 may use a machine learning model to determine a score for an application. For example, the machine learning model may have been trained on training data that identifies combinations of values for the set of metrics and corresponding scores. Additionally, or alternatively, and as another example, the machine learning model may process historical data that identifies values for the other set of metrics and corresponding scores to identify similarities between the historical data and the values for the set of metrics for an application to determine the score for the application. Continuing with the previous example, application analysis platform 230 may identify similar patterns of values, similar combinations of values, similar satisfactions of thresholds, and/or the like between values for the set of metrics for the other set of applications and values for the set of metrics for the application being analyzed.

In some implementations, application analysis platform 230 may determine the score based on one or more other scores. For example, application analysis platform 230 may determine individual scores for each metric of the set of metrics and may determine the score by averaging the scores, multiplying the scores, applying a function to the scores, weighting the scores, and/or the like.

Additionally, or alternatively, and as another example, application analysis platform 230 may determine individual scores for different factors related to an application and may determine the score based on the scores. Continuing with the previous example, application analysis platform 230 may determine a first score for a technical maturity of the application (e.g., an extent to which the application is the most up-to-date version of the application, a database version of a database associated with the application, a quantity of issue tickets for the application in a time period, a technology relevance of an application, such as whether an up-to-date version of the application is installed, a stability of an application, such as a quantity of technical issues the application experiences in a time period, a volatility of an application, such as a quantity of requests for new and/or different features that a support department receives for the application, a scalability of an application, such as whether the application can be easily updated and/or customized to include new features, etc.), a second score for a financial maturity of the application (e.g., a cost of maintaining the application, a cost of a license associated with the application, a cost of maintaining software or hardware related to the application, etc.), a third score for a governance maturity of the application (e.g., an extent to which a team is dedicated to managing the application, an extent to which user documentation is available for the application, an extent to which the application uses sensitive data, such as personal data, whether source code is available for the application, etc.), a fourth score for a functional maturity of the application (e.g., an extent to which the application is functioning properly, an up-time requirement for the application, a quantity of processes supported by the application, a mapping between the application and organizational processes or sub-assessment sections thereof, such as organizational alignment, scalability, flexibility, and/or the like, an extent to which the application aligns with an organizational process, such as based on metrics, etc.), a fifth score for a digital maturity of the application (e.g., an extent to which the application is ready for mobile deployment, an extent to which the application is ready for cloud-deployment, an extent to which analytics related to use and/or performance of the application are possible, etc.), and/or the like and may determine the score based on the first score, the second score, the third score, the fourth score, the fifth score, and so forth (e.g., by averaging the scores, by applying a function to the scores, weighting the scores, etc.).

In some implementations, application analysis platform 230 may determine a refined score (e.g., based on historical data). In some implementations, application analysis platform 230 may use a machine learning model to process the score and historical data to determine the refined score. For example, application analysis platform 230 may process the historical data to identify manual modifications to scores, anomalous scores, trends and/or patterns in the historical data that are different from trends and/or patterns in the application data, and/or the like and may modify a score for an application to generate the refined score (e.g., by modifying the score up or down) based on a result of processing the historical data. As a specific example, application analysis platform 230 may determine that values for a first application (in the other set of applications) are similar to values for a second application (in the set of applications) using the machine learning model and may determine that the historical data indicates that the score for the first application was adjusted up manually after the score was determined for the first application. In this case, application analysis platform 230 may adjust the score for the second application up in a similar manner. This improves determination of a score for an application via dynamic modification of the score. This conserves processing resources that would be consumed using an unrefined score, such as processing resources that would be consumed re-performing an analysis.

Additionally, or alternatively, application analysis platform 230 may normalize the score based on historical data. For example, application analysis platform 230 may modify the score to fit a normal distribution of historical scores for other applications. This facilitates a contextual analysis of the score relative to past scores for the application, relative to other scores for other applications, and/or the like, thereby improving an analysis of the application.

In this way, application analysis platform 230 may determine a score that is indicative of a classification of an application prior to refining the classification indicated by the score.

As further shown in FIG. 4, process 400 may include determining a refined classification for the each application of the set of applications by processing the historical data and/or information related to the classification and/or the score (block 440). For example, application analysis platform 230 may determine (e.g., using computing resource 234, processor 320, and/or the like) a refined classification for the each application of the set of applications by processing the historical data and/or information related to the classification and/or the score. In some implementations, application analysis platform 230 may use a classification module to determine the refined classification, as described elsewhere herein.

In some implementations, the score may indicate a classification for an application. For example, the score may indicate a classification for the application based on the score satisfying a threshold, based on being within a range of values, based on improving by a threshold amount relative to a previously determined score, and/or the like. As a specific example, the score may indicate that the application is healthy, is performing normally, is consuming a normal amount of computing resources, and/or the like based on the score for the application satisfying a threshold, being within a range of values, improving by a threshold amount relative to a previously determined score, and/or the like. In some implementations, application analysis platform 230 may determine the classification for the application based on the score. For example, application analysis platform 230 may perform a lookup of the score in a data structure that includes information identifying scores and corresponding classifications.

In some implementations, application analysis platform 230 may determine a refined classification for an application based on a score (e.g., a refined score) for the application. For example, application analysis platform 230 may determine a refined classification for the application based on manual interventions, anomalies, trends, patterns, and/or the like identified in the historical data such that the refined classification accounts for the impact these may have had on the classification for other applications. As a specific example, application analysis platform 230 may modify a classification for an application from healthy to needs technical improvement based on past manual modifications of classifications for similar applications, based on classifications for applications with similar values for the set of metrics, and/or the like. In this way, application analysis platform 230 may determine a manner in which to modify a classification to form a refined classification using a machine learning model. In some implementations, the refined classification may be used to determine a manner in which to optimize a deployment of an application.

In some implementations, a classification (or a refined classification) may indicate a theme and/or disposition for optimizing deployment of the set of applications. For example, a theme may include increasing connectivity of devices, increasing availability of data stored by the applications (e.g., via use of application programming interfaces (APIs)), modifying computing infrastructure for the set of applications, utilizing technical re-design and/or technical remediation of an architecture for the set of applications (e.g., updating or modifying a technical architecture of an application, such as to make the architecture more scalable and flexible), and/or the like. In some implementations, a disposition may identify a high level strategy for implementing a theme. For example, a disposition may include re-platforming an application (e.g., from client device 210 deployment to a cloud deployment or vice versa), replacing an application (e.g., with a competitor application, with an updated version of the application, etc.), decommissioning an application from use, remediating an application (e.g., fixing an issue with the application, customizing the application, etc.), expanding the application into multiple applications, consolidating the application with one or more other applications, and/or the like.

In some implementations, application analysis platform 230 may determine a theme and/or a disposition for an application based on a refined classification for the application. For example, for the refined classification of needs technical improvement, application analysis platform 230 may identify modifying a technical infrastructure as a theme for optimizing deployment of the application and may identify replacing the application and/or re-platforming the application as dispositions for the application. In some implementations, application analysis platform 230 may identify a theme and/or a disposition by performing a lookup in a data structure of information identifying the refined classification for the application (e.g., a data structure that includes information identifying different classifications and possible themes and/or dispositions). Additionally, or alternatively, application analysis platform 230 may use a machine learning model to identify a theme and/or a disposition. For example, application analysis platform 230 may process information identifying the refined classification, application data associated with the application, historical data associated with another application, and/or the like to identify a theme and/or a disposition based on similarities between the application and the other application. In this way, application analysis platform 230 may quickly and efficiently determine a theme and/or a disposition related to optimizing deployment of an application.

In this way, application analysis platform 230 may determine a refined classification for the each application of the set of applications prior to generating a recommendation related to optimizing deployment of the each application of the set of applications.

As further shown in FIG. 4, process 400 may include generating, based on the refined classification, a set of recommendations related to optimizing deployment of the set of applications (block 450). For example, application analysis platform 230 may generate (e.g., using computing resource 234, processor 320, and/or the like), based on the refined classification, a set of recommendations related to optimizing deployment of the set of applications. In some implementations, application analysis platform 230 may generate the set of recommendations using a recommendations module, similar to that described elsewhere herein.

In some implementations, application analysis platform 230 may dynamically determine the set of recommendations based on a theme, a disposition, a refined classification, and/or the like associated with an application. For example, different themes, dispositions, refined classifications, and/or the like may be associated with different recommendations.

In some implementations, application analysis platform 230 may perform a lookup of information identifying a theme, a disposition, a refined classification, and/or the like in a data structure to identify a recommendation. For example, the data structure may include information that identifies various themes, dispositions, refined classifications, and/or the like and corresponding recommendations. Additionally, or alternatively, application analysis platform 230 may determine the set of recommendations using a machine learning model. For example, the machine learning model may have been trained on information that identifies recommendations and historical data and/or information identifying various themes, dispositions, classifications, and/or the like for corresponding applications. In this case, application analysis platform 230 may process the application data related to an application, the refined classification associated with the application, a theme and/or disposition related to the application, and/or the like and may generate recommendations similar that which were generated previously for similarly situated applications.

Additionally, or alternatively, the set of recommendations may be research based. For example, application analysis platform 230 may use an artificial intelligence model to crawl the Internet to identify actions that other organizations have taken with regard to various themes, dispositions, refined classifications, and/or the like and may generate possible recommendations based on a result of crawling the Internet. Additionally, or alternatively, and as another example, application analysis platform 230 may use the artificial intelligence model to identify specific actions that are to be performed based on the set of recommendations (e.g., may identify a specific version of an application to download, may identify a specific vendor to which to switch technical support services, etc.) Examples of recommendations that application analysis platform 230 may generate can include updating an application to the latest version, uninstalling an application, installing another application, switching deployment of the application from being installed on client device 210 to being cloud-based, hiring an outside technical support provider, changing a license associated with the application from a first license to a second license, and/or the like.

In this way, application analysis platform 230 may generate a set of recommendations prior to performing an action to facilitate implementation of the set of recommendations.

As further shown in FIG. 4, process 400 may include performing an action to facilitate implementation of the set of recommendations (block 460). For example, application analysis platform 230 may perform (e.g., using computing resource 234, processor 320, and/or the like) an action to facilitate implementation of the set of recommendations.

In some implementations, application analysis platform 230 may output a message to client device 210 with a link for downloading an application or an updated version of an application. Additionally, or alternatively, application analysis platform 230 may download an application (or an updated version of an application) and may install the application (e.g., on computing resource 234, client device 210, etc.). Additionally, or alternatively, application analysis platform 230 may uninstall an application. Additionally, or alternatively, application analysis platform 230 may generate a report that identifies the set of recommendations and may output the report for display via client device 210. Additionally, or alternatively, application analysis platform 230 may generate a work order for a recommendation to be implemented. Additionally, or alternatively, application analysis platform 230 may modify deployment of an application from a first server device 220 to a second server device 220.

Additionally, or alternatively, application analysis platform 230 may schedule a meeting (e.g., related to a result of analyzing the set of applications) using electronic calendars associated with individuals to attend the meeting. Additionally, or alternatively, application analysis platform 230 may generate a calendar item for the meeting (e.g., by generating an event notification, a calendar invite, etc. for the meeting). Additionally, or alternatively, application analysis platform 230 may trigger an alarm to have the set of recommendations be implemented. Additionally, or alternatively, application analysis platform 230 may send a message to client device 210 (e.g., an email, a short message services (SMS) message, etc.) that includes information identifying the set of recommendations.

Additionally, or alternatively, application analysis platform 230 may cause a user interface to be provided for display via a display associated with client device 210. For example, the user interface may permit a user of client device 210 to select actions for application analysis platform 230 to perform, may display a result of analyzing the set of applications, may identify benefits (e.g., cost savings, computing resource consumption savings, etc.) to be expected from implementing different recommendations, and/or the like.

In this way, application analysis platform 230 may perform an action to facilitate implementation of the set of recommendations.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
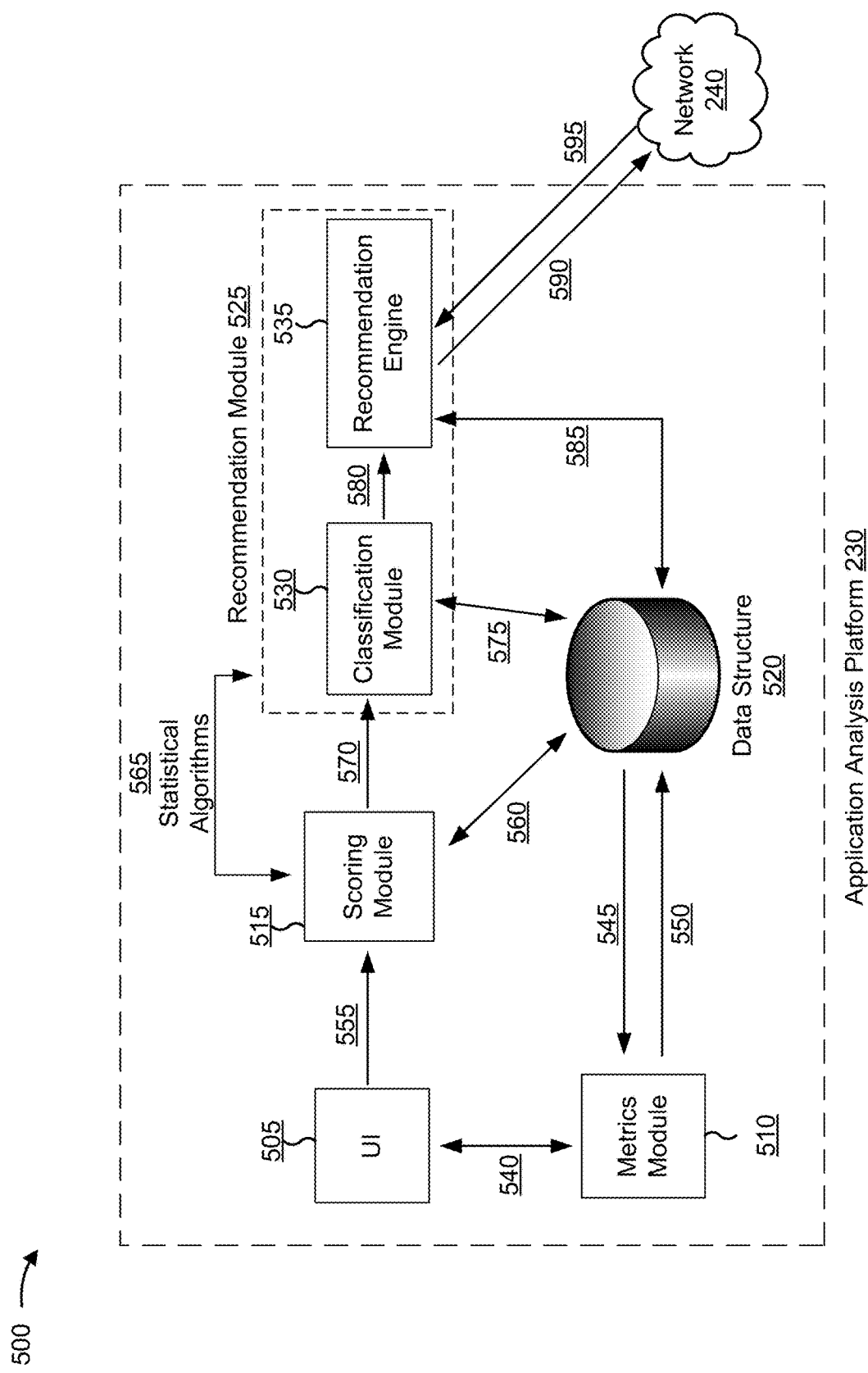
FIG. 5 is a diagram of an example implementation relating to the example process shown in FIG. 4.

FIG. 5 is a diagram of an example implementation 500 relating to example process 400 shown in FIG. 4. FIG. 5 shows an example of interactions between various elements of application analysis platform 230. As shown, application analysis platform 230 includes a user interface (UI) 505, a metrics module 510, a scoring module 515, a data structure 520, and/or a recommendation module 525 that includes a classification module 530 and a recommendation engine 535 (e.g., a machine learning-based and/or an artificial intelligence-based recommendation engine 535). In addition, as shown, implementation 500 includes network 240.

As shown in FIG. 5, and by reference number 540, metrics module 510 may receive application data via UI 505. Additionally, or alternatively, and as further shown by reference number 540, metrics module 510 may output information identifying metrics related to analyzing a set of applications, values for the set of metrics, and/or the like. As shown by reference number 545, metrics module 510 may access, in data structure 520, historical data for another set of applications (e.g., to be used to identify the set of metrics to be used to analyze the set of applications, to be used to identify baseline values for the set of metrics, etc.). As shown by reference number 550, metrics module 510 may store, in data structure 520, information identifying the set of metrics to be used to analyze the set of applications, values for the set of metrics for the set of applications, baseline values for the set of metrics, and/or the like.

As shown by reference number 555, scoring module 515 may receive, from UI 505, application data related to the set of applications to be analyzed. As shown by reference number 560, scoring module 515 may access, from data structure 520, information identifying the set of metrics to be used to analyze the set of applications, values for the set of metrics, historical scores for the other set of applications, and/or the like. As shown by reference number 565, scoring module 515 may use various statistical algorithms to determine a score for each application of the set of applications being analyzed. Additionally, or alternatively, and as further shown by reference number 565, recommendation module 525 may use the same or different statistical algorithms to determine a classification and/or a set of recommendations for each application of the set of applications (e.g., by plotting the score to a heat map, to a chart, etc.).

As shown by reference number 570, scoring module 515 may provide, to classification module 530, a score for each application of the set of applications and classification module 530 may determine a classification for the each application of the set of applications based on the score. As shown by reference number 575, classification module 530 may access, from data structure 520, information that identifies historical themes, dispositions, classifications, and/or the like for the other set of applications. In some implementations, classification module 530 may determine a refined classification for the each application of the set of applications based on this information.

As shown by reference number 580, classification module 530 may output information identifying a refined classification for each application of the set of applications to recommendation engine 535. Recommendation engine 535 may determine a set of recommendations for the each application of the set of applications in a manner similar to that described elsewhere herein. For example, and as shown by reference number 585, recommendation engine 535 may identify the set of recommendations based on processing information in data structure 520 that identifies historical recommendations for the other set of applications. In some implementations, and similar to that described elsewhere herein, recommendation engine 535 may communicate with network 240 to identify the set of recommendations, specific actions to be performed for each recommendation, and/or the like (as shown by reference numbers 590 and 595). In some implementations, application analysis platform 230 may output a result of analyzing the set of applications via UI 505 (e.g., information that identifies the set of recommendations, a refined classification for the each application of the set of applications, a score for the each application of the set of applications, and/or the like).

As indicated above, FIG. 5 is provided merely as an example. Other examples are possible and may differ from what was described with regard to FIG. 5.

Although some implementations were described with regard to a single application associated with a single organization, application analysis platform 230 may analyze hundreds, thousands, or more applications for hundreds, thousands, or more organizations.

In this way, application analysis platform 230 may dynamically optimize a deployment of a set of applications based on application data for the set of applications and/or historical data for another set of applications. This improves deployment of the set of applications via a more efficient deployment. In addition, this improves operations of an organization that utilize the set of applications via an improved deployment of the set of applications. Further, by improving deployment of the set of applications, excess consumption of computing resources that resulted from a less efficient deployment may be reduced or eliminated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
process application data or historical data to identify a set of metrics to be used to analyze a set of applications or to identify baseline values for the set of metrics,
wherein the application data is related to the set of applications to be analyzed,
wherein the historical data is related to another set of applications previously analyzed, and
wherein the application data or the historical data is received from one or more devices or from one or more sensors associated with the one or more devices;
determine a score, for each application of the set of applications, based on values for the set of metrics for the each application of the set of applications after processing the application data or the historical data,
wherein the score indicates a classification for the each application of the set of applications;
identify that the historical data indicates a modification of a classification of another application, of the one or more other applications, to healthy based on the other application having threshold availability and regardless of whether a performance of the other application satisfies a performance threshold;
determine a refined classification for the each application, of the set of applications, based on the modification of the classification of the other application to healthy,
wherein the refined classification is to be used to determine a manner in which to optimize a deployment of the set of applications;
generate a set of recommendations based on the refined classification; and
perform an action to implement the set of recommendations related to optimizing the deployment of the set of applications.

2. The device of claim 1, wherein the set of recommendations includes at least one of:
replacing an application, of the set of applications, with the other application,
updating the application to a newer version of the application,
decommissioning the application,
re-platforming the application,
separating the application into multiple applications,
redesigning a technical architecture related to the application, or
combining the multiple applications into a single application.

3. The device of claim 1, wherein the one or more processors, when determining the score, are to:
determine the score based on multiple other scores related to the each application of the set of applications.

4. The device of claim 1, wherein the one or more processors, when processing the application data or the historical data to identify the set of metrics, are further to:
process the application data or the historical data to identify at least one application of the other set of applications that is similar to the set of applications to be analyzed; and
process the historical data related to the at least one application of the other set of applications to identify the set of metrics.

5. The device of claim 1, wherein the one or more processors are further to:
determine the classification for the each application of the set of applications based on the score; and
wherein the one or more processors, when determining the refined classification, are to:
determine the refined classification after determining the classification.

6. The device of claim 1, wherein the one or more processors, when performing the action, are to:
   download at least one of:
      an application to replace one application of the set of applications, or
      an updated version of the one application of the set of applications; and
   install the application or the updated version of the one application of the set of applications on a client device or a server device after downloading the application or the updated version of the one application of the set of applications.

7. The device of claim 1, wherein the one or more processors, when performing the action, are to:
   uninstall at least one application of the set of applications after determining the refined classification for the at least one application of the set of applications.

8. A method, comprising:
   processing, by a device including a processor, application data or historical data to identify a set of metrics to be used to analyze a set of applications or to identify baseline values for the set of metrics,
      wherein the application data is related to the set of applications to be analyzed,
      wherein the historical data is related to another set of applications previously analyzed,
      wherein the application data or the historical data is received from one or more devices or from one or more sensors associated with the one or more devices;
   determining, by the device, a score, for each application of the set of applications, based on values for the set of metrics for the each application of the set of applications,
      wherein the score indicates a classification for the each application of the set of applications;
   identifying, by the device, that the historical data indicates a modification of a classification of another application, of the one or more other applications, to healthy based on the other application having threshold availability and regardless of whether a performance of the other application satisfies a performance threshold;
   determining, by the device, a refined classification for the each application of the set of applications based on the modification of the classification of the other application to healthy;
   generating, by the device, a set of recommendations related to optimizing a current deployment of the set of applications after determining the refined classification; and
   performing, by the device, an action to implement the set of recommendations related to optimizing the current deployment of the set of applications.

9. The method of claim 8, further comprising:
   determining a first score for a technical maturity of the each application of the set of applications;
   determining a second score for a financial maturity of the each application of the set of applications;
   determining a third score for a governance maturity of the each application of the set of applications,
   determining a fourth score for a functional maturity of the each application of the set of applications;
   determining a fifth score for a digital maturity of the each application of the set of applications; and
   wherein determining the score comprises:
      determining the score based on the first score, the second score, the third score, the fourth score, and the fifth score.

10. The method of claim 8, wherein generating the set of recommendations comprises:
   generating the set of recommendations by processing the refined classification using a machine learning model.

11. The method of claim 8, wherein determining the score comprises:
   determining a set of scores for a set of factors related to the each application of the set of applications; and
   determining the score based on the set of scores for the set of factors.

12. The method of claim 8, wherein processing the application data or the historical data to identify the set of metrics comprises:
   processing the historical data using a machine learning model to identify the set of metrics or the baseline values for the set of metrics; and
   processing the application data for the set of applications to identify values for the set of metrics for the each application of the set of applications.

13. The method of claim 8, wherein performing the action comprises:
   generating a report that identifies the set of recommendations after generating the set of recommendations; and
   outputting the report for display via a client device.

14. The method of claim 8, wherein performing the action comprises:
   outputting, for display via a user interface associated with a client device, information that identifies the set of recommendations, the score, or the refined classification.

15. A non-transitory computer-readable medium storing instructions, the instructions comprising:
   one or more instructions that, when executed by one or more processors, cause the one or more processors to:
      receive application data or historical data,
         wherein the application data is related to a set of applications to be analyzed,
         wherein the historical data is related to another set of applications,
         wherein the application data or the historical data is received from one or more devices or one or more sensors associated with the one or more devices;
      process the application data or the historical data to identify a set of metrics to be used to analyze the set of applications or to identify baseline values for the set of metrics;
      determine a score, for each application of the set of applications, based on values for the set of metrics for the each application of the set of applications,
         wherein the score indicates a classification for the each application of the set of applications;
      identify that the historical data indicates a modification of a classification of another application, of the one or more other applications, to healthy based on the other application having threshold availability and regardless of whether a performance of the other application satisfies a performance threshold;
      determine a refined classification for the each application of the set of applications based on the modification of the classification of the other application to healthy, wherein the refined classification is to be used to determine a manner in which to optimize a current deployment of the set of applications; and perform an action to implement a set of recommendations related to optimizing the current deployment of the set of applications.

16. The non-transitory computer-readable medium of claim 15, wherein the one or more instructions, when executed by the one or more processors, further cause the one or more processors to:

determine a manner in which to modify the classification associated with the each application of the set of applications using a machine learning model; and wherein the one or more instructions, that cause the one or more processors to determine the refined classification, cause the one or more processors to:

determine the refined classification after determining the manner in which to modify the classification.

17. The non-transitory computer-readable medium of claim 16, wherein the one or more instructions, when executed by the one or more processors, further cause the one or more processors to:

process the historical data to identify at least one of:

a manual modification to another classification of one application of the other set of applications, an anomaly in the historical data, or a trend or pattern in the historical data that is different than another trend or another pattern in the application data; and wherein the one or more instructions, that cause the one or more processors to determine the manner in which to modify the classification, cause the one or more processors to:

determine the manner in which to modify the classification based on a result of processing the historical data to identify the at least one of the manual modification, the anomaly, or the trend or the pattern that is different than the other trend or the other pattern.

18. The non-transitory computer-readable medium of claim 15, wherein the one or more instructions, when executed by the one or more processors, further cause the one or more processors to:

determine a refined score using a machine learning model after determining the score; and wherein the one or more instructions, that cause the one or more processors to determine the refined classification, cause the one or more processors to:

determine the refined classification based on the refined score.

19. The non-transitory computer-readable medium of claim 15, wherein the one or more instructions, that cause the one or more processors to perform the action, cause the one or more processors to:

send a message to a client device after generating the set of recommendations, the message including information that identifies the set of recommendations, the refined classification, or the score.

20. The non-transitory computer-readable medium of claim 15, wherein the one or more instructions, that cause the one or more processors to perform the action, cause the one or more processors to:

trigger an alarm after generating the set of recommendations.

* * * * *